US006721639B2

(12) United States Patent
Raypole et al.

(10) Patent No.: US 6,721,639 B2
(45) Date of Patent: Apr. 13, 2004

(54) HI-RESOLUTION DIGITAL STEERING SENSOR FAULT DETECTION

(75) Inventors: Steve K. Raypole, Tipp City, OH (US);
Kirk T. Billings, Dayton, OH (US);
James M. Petrofes, Tipp City, OH (US); Michael Pawlowski, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 113 days.

(21) Appl. No.: 10/028,240

(22) Filed: Dec. 20, 2001

(65) Prior Publication Data

US 2003/0120406 A1 Jun. 26, 2003

(51) Int. Cl.[7] .............................. G06F 19/00; B62D 5/00
(52) U.S. Cl. ........................................... 701/34; 701/29
(58) Field of Search ............................. 701/29, 34, 41, 701/43, 37; 280/5.51

(56) References Cited

U.S. PATENT DOCUMENTS

| 4,803,629 | A | * | 2/1989 | Noto et al. ................... 701/41 |
| 4,996,657 | A | * | 2/1991 | Shiraishi et al. ............ 702/151 |
| 5,029,466 | A | * | 7/1991 | Nishihara et al. .......... 73/118.1 |
| 5,065,325 | A | * | 11/1991 | Takahashi .................... 701/43 |
| 5,119,302 | A | * | 6/1992 | Abe et al. ..................... 701/41 |
| 5,707,117 | A | * | 1/1998 | Hu et al. ............... 303/122.08 |

FOREIGN PATENT DOCUMENTS

JP        2000-203443       *  7/2000

* cited by examiner

Primary Examiner—Michael J. Zanelli
(74) Attorney, Agent, or Firm—Michael D. Smith

(57) ABSTRACT

A system and method for digital steering sensor fault detection comprises monitoring steering wheel position information from a digital steering wheel position sensor at set time intervals, determining steering wheel position information for the current time interval and the previous time interval, and advancing a value change counter if the steering wheel position information for the current time interval is the same as for the previous time interval; monitoring vehicle speed, and advancing a speed cycle counter when the vehicle speed crosses a first threshold speed after crossing a second threshold speed; and setting fault bit information if the value change counter is zero after the speed cycle counter reaches a speed cycle limit. The steering wheel position information can be for a plurality of digital steering wheel position sensor outputs and provide corresponding fault bits, which can be compared to a fault table to diagnose a particular fault.

33 Claims, 8 Drawing Sheets

| Fault Condition | Phase A Fault | Phase B Fault | Index Fault | General Snsr Fault |
|---|---|---|---|---|
| Phase A Short to Battery | 0 | N/A | N/A | 1 |
| Phase A Short to Ground | 1 | N/A | N/A | 0 |
| Phase A Open Circuit | 1 | N/A | N/A | 0 |
| Phase B Short to Battery | N/A | 0 | N/A | 1 |
| Phase B Short to Ground | N/A | 1 | N/A | 0 |
| Phase B Open Circuit | N/A | 1 | N/A | 0 |
| Index Short to Battery | N/A | N/A | 0 | 1 |
| Index Short to Ground | N/A | N/A | 1 | 0 |
| Index Open Circuit | N/A | N/A | 1 | 0 |
| Sensor Supply Open Circuit | 0 | 0 | 0 | 1 |
| Sensor Supply Short to Ground | 0 | 0 | 0 | 1 |
| Sensor Return Open Circuit | 0 | 0 | 0 | 1 |
| Sensor Return Short to Battery | 0 | 0 | 0 | 1 |

N/A indicates 0 or 1

FIG. 8

HI-RESOLUTION DIGITAL STEERING SENSOR FAULT DETECTION

TECHNICAL FIELD

This invention relates generally to the field of vehicle steering control, and in particular, to a system and method for digital steering sensor fault detection.

BACKGROUND OF THE INVENTION

With the increase in electronic monitoring and control in vehicles, there is a need for information on steering wheel position for multiple vehicle control modules such as suspension ride control. Currently, sensors having both analog and digital outputs are used.

Considerable reduction in both sensor and controller costs can be realized by omitting the hardware associated with the analog signal. Digital signals are more forgiving than analog signals when shared. Ground offsets, ratiometric outputs, impedance loading and etc. do not impact digital signals as they do for analog signals. However, diagnosing signal and sensor faults are very difficult for a controller receiving digital signals alone.

Presently, if a digital handwheel position sensor does not see vehicle handwheel rotation, as occurs if the vehicle is driven straight, the signals stay constant (either high or low). Therefore, the sensor's output for a vehicle driven straight has the same exact signal characteristics as a failed sensor or output. Because of this situation, digital handwheel position sensors typically incorporate an analog signal output to diagnose sensor faults. Typical diagnostic requirements are to detect the following faults/conditions: 1) digital output signal open circuited, shorted-to-battery or shorted-to-ground; 2) digital steering sensor ground (return) circuit open; and 3) digital steering sensor supply circuit open. A controller module receiving only digital steering signals has no means of determining that a digital handwheel position sensor or one of its outputs have failed.

Accordingly, it would be desirable to have a system and method for digital steering sensor fault detection that overcomes the disadvantages described.

SUMMARY OF THE INVENTION

One aspect of the invention provides a system and method for digital steering sensor fault detection that avoids the need for steering sensor analog outputs.

Another aspect of the invention provides a system and method for digital steering sensor fault detection that is able to discriminate between sensor faults and normal operation.

Another aspect of the invention provides a system and method for digital steering sensor fault detection that is able to detect faults and conditions, such as: 1) digital output signal open circuited, shorted-to-battery or shorted-to-ground; 2) digital steering sensor ground circuit open; and 3) digital steering sensor supply circuit open.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 8 is a Fault Table for a system and method for digital steering sensor fault detection made in accordance with the present invention.

DETAILED DESCRIPTION OF THE PRESENTLY PREFERRED EMBODIMENTS

A system and method for digital steering sensor fault detection comprises monitoring steering wheel position information from a digital steering wheel position sensor at set time intervals, determining steering wheel position information for the current time interval and the previous time interval, and advancing a value change counter if the steering wheel position information for the current time interval is the same as for the previous time interval; monitoring vehicle speed, and advancing a speed cycle counter when the vehicle speed crosses a first threshold speed after crossing a second threshold speed; and setting fault bit information if the value change counter is zero after the speed cycle counter reaches a speed cycle limit. The steering wheel position information can be for a plurality of digital steering wheel position sensor outputs and provide corresponding fault bits, which can be compared to a fault table to diagnose a particular fault.

Figure 1:
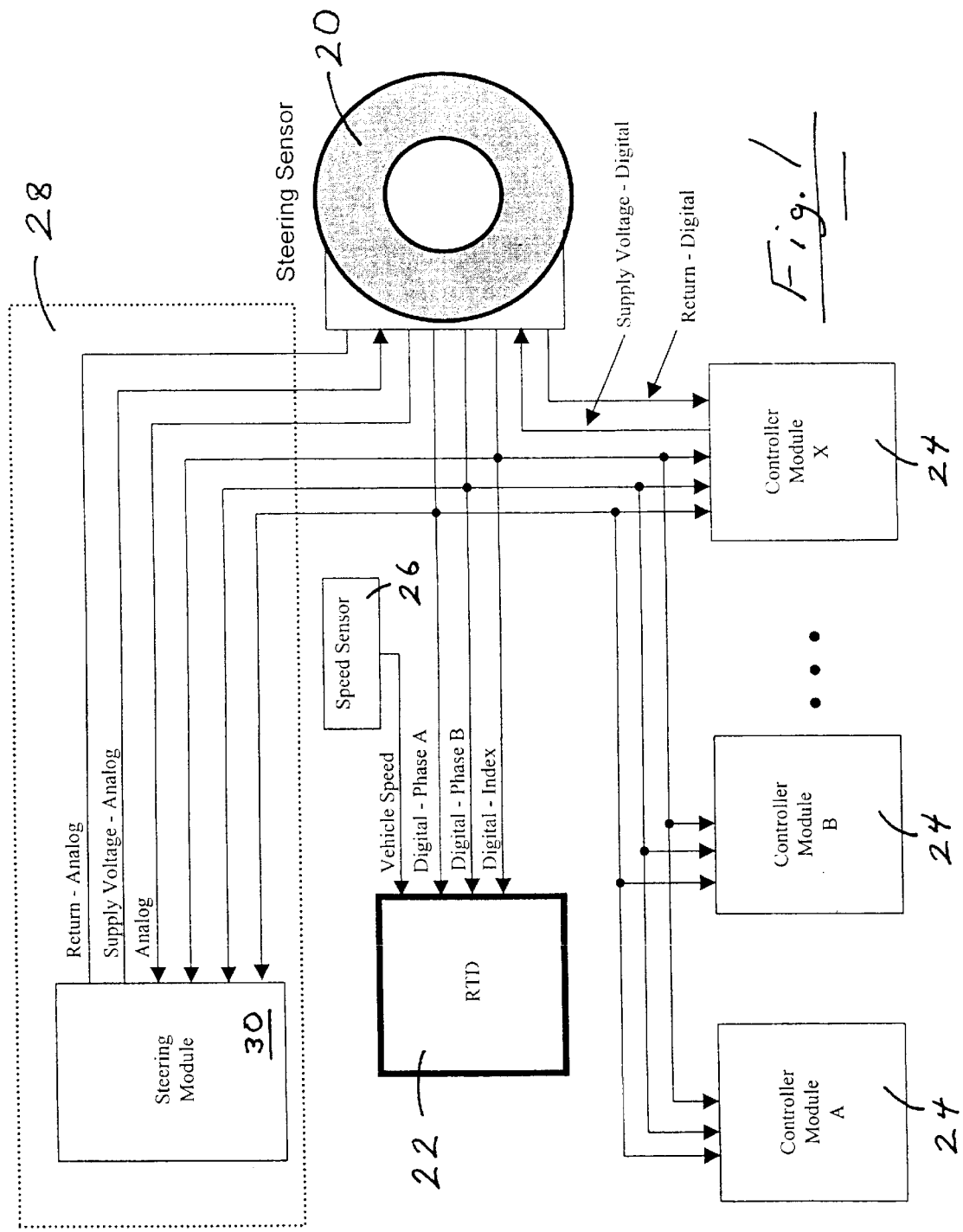
FIG. 1 is a block diagram of a digital steering sensor system made in accordance with the present invention.

FIG. 1 is a block diagram of a digital steering sensor system made in accordance with the present invention. The steering sensor 20 mounts at the base of the steering column and senses the relative position of the steering wheel. Steering sensor 20 converts the sensed changes to three digital outputs: Digital—Phase A, Digital—Phase B, and Digital—Index. The digital outputs can be supplied to a real time damping (RTD) controller module 22 and other controller modules 24 requiring digital steering data. The RTD controller module 22 and other controller modules 24 also receive vehicle speed information from a speed sensor 26 to allow digital steering sensor fault detection. The Supply Voltage—Digital and Return—Digital provide digital power and ground, respectively, to the steering sensor 20.

The analog processing system 28 is an optional system that can be used if the steering sensor 20 provides analog outputs as well as digital outputs. The analog steering module 30 can receive the analog output from the steering sensor 20 and the digital outputs. The Supply Voltage—Analog and Return—Analog provide analog power and ground, respectively, to the steering sensor 20. The analog steering module 30 can process the digital and analog outputs to provide steering angle and diagnostics confirmation to modules that are using the digital steering sensor alone. Phase A and Phase B digital outputs can be quadrature pulsed data corresponding to handwheel rotation. Each signal can consist of a predetermined number of electrical cycles per single complete mechanical rotation of the handwheel. The Phase B digital output is offset from the Phase A digital output to enable the determination of handwheel rotational displacement and direction. Phase A and Phase B digital outputs can have rising and falling edges for each electrical cycle to allows resolution of handwheel angle to within one mechanical degree.

The Index digital output can be a reference electrical pulse, providing one electrical pulse per single complete mechanical rotation of the handwheel. This Index digital output can be used as a rotation counter, which is needed because a handwheel can complete multiple 360-degree rotations.

RTD controller module 22 and other controller modules 24 using the system and method of the present invention can be a computer, microcomputer, or microprocessor, with ROM and RAM and appropriate input and output circuits. In one embodiment, RTD controller module 22 can be a microprocessor unit with computer-readable storage media, such as read-only memory (ROM) and random access memory (RAM). The present invention is not limited to a particular type of processor or computer-readable storage medium, examples of which are provided for convenience of description only.

The RTD controller module 22 can be part of a Bi-State Real-Time Damping monotube (BSRTD) system for vehicles, which is a semi-active, two-position damping control system that responds in real-time to road conditions and driving conditions, based on body and wheel motions as determined through position sensors. The BSRTD system comprises four two-position monotube shocks with internal solenoid valve, four wheel-to-body position sensors, and a RTD controller module 22 as a controller. The BSRTD system can provide instantaneous suspension response to wheel speed, body position, vehicle speed, steering angle and braking by monitoring the wheel-to-body position sensors and adjusting the stiffness of the two-position monotube shocks using the internal solenoid valve. Those skilled in the art will appreciate that there are many applications for the digital steering sensor fault detection system and method of the present invention: the BSRTD system provides one example of the many applications.

Figure 2:
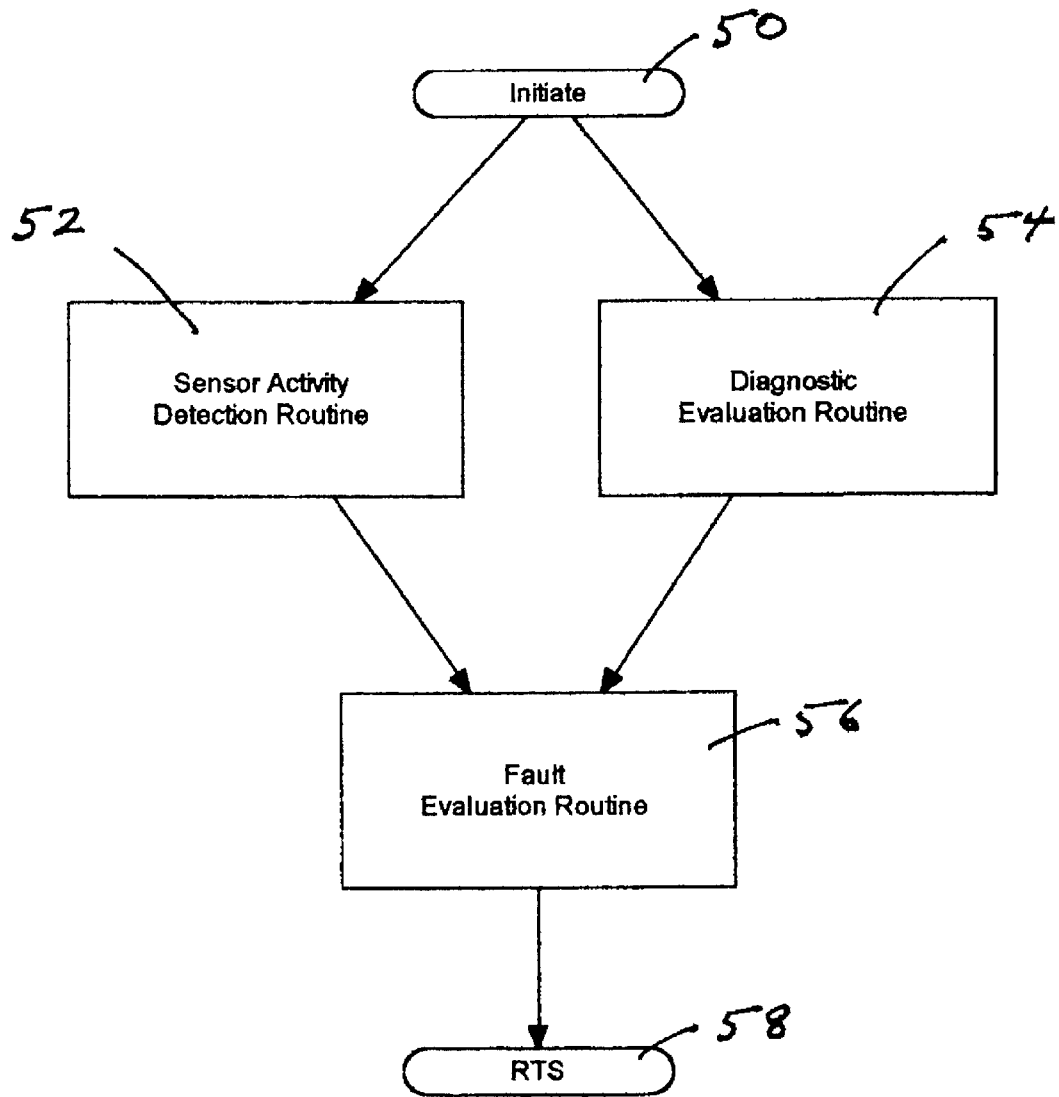
FIG. 2 is a flow chart of a method for digital steering sensor fault detection made in accordance with the present invention.

FIG. 2 is a flow chart of a method for digital steering sensor fault detection made in accordance with the present invention. On initiating the digital steering sensor fault detection method (50), Sensor Activity Detection Routine 52 and Diagnostic Evaluation Routine 54 run simultaneously. Both the Sensor Activity Detection Routine 52 and Diagnostic Evaluation Routine 54 run once per system cycle, when requested by the controller. Typically, the system cycle can be several milliseconds long, and can range from a few microseconds to a number of seconds. In one embodiment, the Sensor Activity Detection Routine 52 can be run at 10 ms and the Diagnostic Evaluation Routine 54 can be run at 960 ms. When the Diagnostic Evaluation Routine 54 detects a preset number of vehicle speed cycles, Fault Evaluation Routine 56 is initiated and the data accumulated by Sensor Activity Detection Routine 52 is analyzed for digital steering sensor faults. The routines end at 58.

Each of the individual routines is discussed in detail below.

Figure 3:
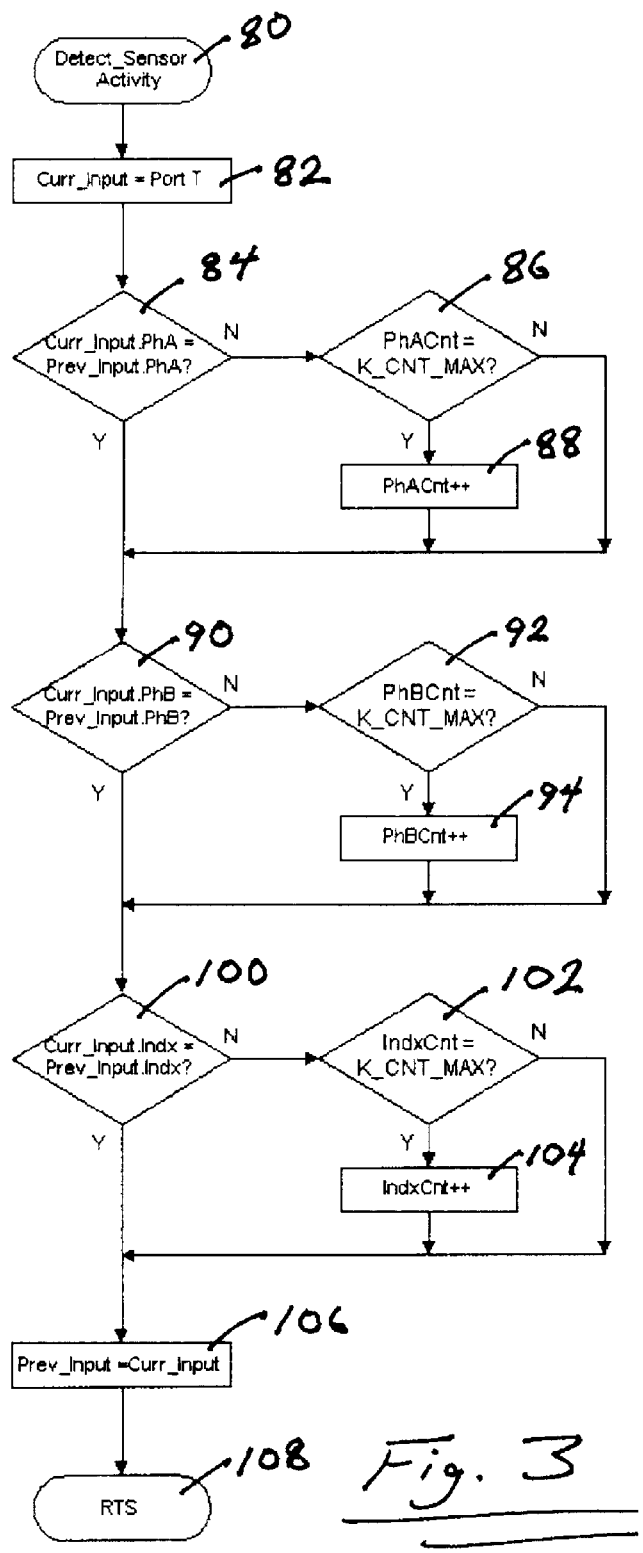
FIG. 3 is a flow chart of a Sensor Activity Detection Routine for a system and method for digital steering sensor fault detection made in accordance with the present invention.

FIG. 3 is a flow chart of a Sensor Activity Detection Routine for a system and method for digital steering sensor fault detection made in accordance with the present invention. The Sensor Activity Detection Routine runs for a set time interval and counts the number of pulse transitions on each of the incoming digital inputs. This is accomplished by checking to see if the current state of an output is different from the previous state. If different, the associated counter is incremented.

The Sensor Activity Detection Routine is activated at 80. The current input variable (Curr_Input) is set to the port under test (Port T) at 82. The current and previous state of the Digital—Phase A, Digital—Phase B, and Digital—Index signals are checked on each iteration of the Sensor Activity Detection Routine. At 84, the current Digital—Phase A signal (Curr_Input.PhA) is compared to the previous Digital-Phase A signal (Prev_Input.PhA). If the two are the same, the routine proceeds to checking the Digital—Phase B signal at 90. If the current and previous signals are different, the Phase A Count (PhACnt) is compared to the maximum count constant (K_CNT_MAX) at 86. In one embodiment, the maximum count constant can be set to 255, although different values can be selected for particular applications. If the Phase A Count has reached the maximum count constant, the routine proceeds to checking the Digital—Phase B signal at 90. If the Phase A Count is less than the maximum count constant, the Phase A Count (PhACnt) is incremented (88) and the routine proceeds to checking the Digital—Phase B signal at 90.

Similarly for the Digital—Phase B signal, the current Digital—Phase B signal (Curr_Input.PhB) is compared to the previous Digital—Phase B signal (Prev_Input.PhB) at 90, the Phase B Count (PhBCnt) is compared to the maximum count constant (K_CNT_MAX) at 92, the Phase B Count (PhACnt) is incremented (94) and the routine proceeds to checking the Digital—Index signal at 100.

For the Digital—Index signal, the current Digital—Index signal (Curr_Input.Indx) is compared to the previous Digital—Index signal (Prev_Input.Indx) at 100, the Index Count (IndxCnt) is compared to the maximum count constant (K_CNT_MAX) at 102, the Index Count (IndxCnt) is incremented (104) and the routine proceeds to 106. The previous input variable (Prev_Input) is set to current input variable (Curr_Input) at 106 and the routine ends at 108.

Figure 4:
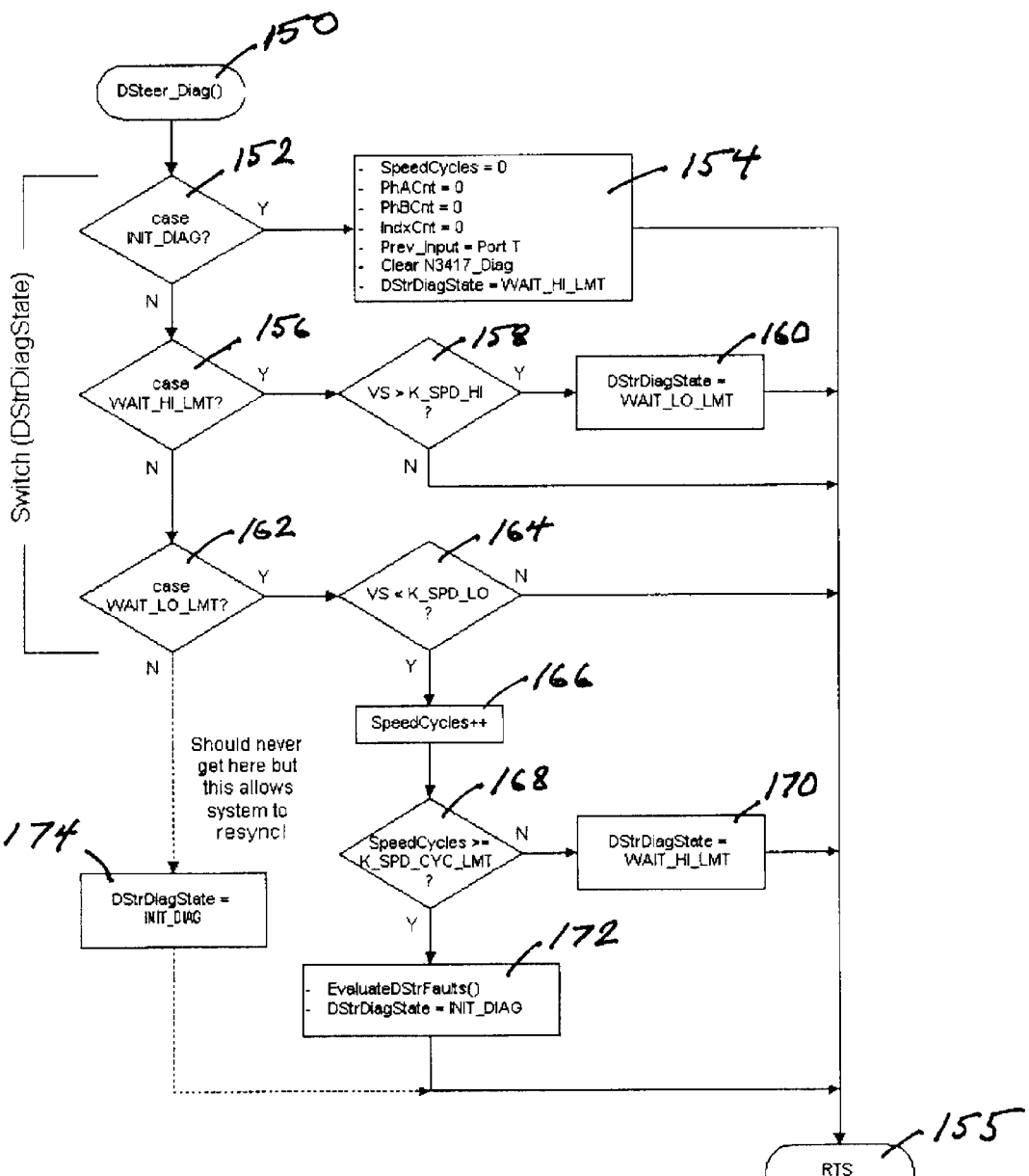
FIG. 4 is a flow chart of a Diagnostic Evaluation Routine for a system and method for digital steering sensor fault detection made in accordance with the present invention.

FIG. 4 is a flow chart of a Diagnostic Evaluation Routine for a system and method for digital steering sensor fault detection made in accordance with the present invention. The Diagnostic Evaluation Routine runs for a set time interval in parallel with the Sensor Activity Detection Routine. The Diagnostic Evaluation Routine monitors vehicle speed and determines when the vehicle has completed the desired number of speed cycles, so that fault evaluation should be performed. A speed cycle occurs when the vehicle's speed increases and crosses a set upper threshold speed and then decreases and crosses a set lower threshold speed. Once a set number of speed cycles have occurred, the Fault Evaluation Routine is called. The upper threshold speed, lower threshold speed, and number of speed cycles can be set as desired to prevent erroneous sensor fault detection.

The Diagnostic Evaluation Routine is activated at 150. For the case of the initial diagnostic run (case INIT_DIAG?) at 152, the values are initialized at 154 and the routine ends at 155. The N3417_Diag steering diagnostic is cleared and the digital steering diagnostic state is set to waiting for high limit (DstrDiagState=WAIT_HI_LIMIT).

For a case other than the initial diagnostic run at 152, the routine determines if the digital steering diagnostic state is set to waiting for high limit (case WAIT_HI_LMT?) at 156. If the routine is awaiting the high limit, the routine checks if the vehicle speed (VS) is above the upper threshold speed (K_SPD_HI) at 158. If the vehicle speed is above the upper threshold speed, the digital steering diagnostic state is set to waiting for low limit (WAIT_LO_LMT) at 160, and the routine ends at 155. Otherwise, the routine ends at 155. The upper threshold speed (K_SPD_HI) can have typical value of 50 kph and can range from 1 to 255 kph.

For the case where the digital steering diagnostic state is not set to waiting for high limit at 156, the routine determines if the digital steering diagnostic state is set to waiting for low limit (case WAIT_LO_LMT?) at 162. If the routine is awaiting the low limit, the routine checks if the vehicle speed (VS) is below the lower threshold speed (K_SPD_LO) at 164. If the vehicle speed is not below the lower threshold speed, the routine ends at 155. The lower threshold speed (K_SPD_LO) can have typical value of 15 kph and can range from 1 to 255 kph. If the vehicle speed is below the lower threshold speed, the speed cycle counter (SpeedCycles) is incremented at 166 and checked to see if the speed cycle counter is greater than or equal to the speed cycle limit (K_SPD_CYC_LMT) at 168. The speed cycle limit (K_SPD_CYC_LMT) can have typical value of 3 and can range from 0 to 255. If the speed cycle counter is not greater than or equal to the speed cycle limit at 168, the digital steering diagnostic state is set to waiting for high limit (WAIT_HI_LMT) at 170 and the routine ends at 155. If the speed cycle counter is greater than or equal to the speed cycle limit at 168, the routine initiates the Fault Evaluation Routine (EvaluateDStrFaults{ }) and sets the digital steering diagnostic state to initial diagnostic run at 172. See FIG. 6 for the Fault Evaluation Routine. The Diagnostic Evaluation Routine then ends at 155.

The Diagnostic Evaluation Routine should never reach block 174, which sets the digital steering diagnostic state to initial diagnostic run after checking if the digital steering diagnostic state is set to waiting for low limit at 162. However, block 174 provides for resynchronization of the routine should the electronics power up in an unexpected state.

Figure 5:
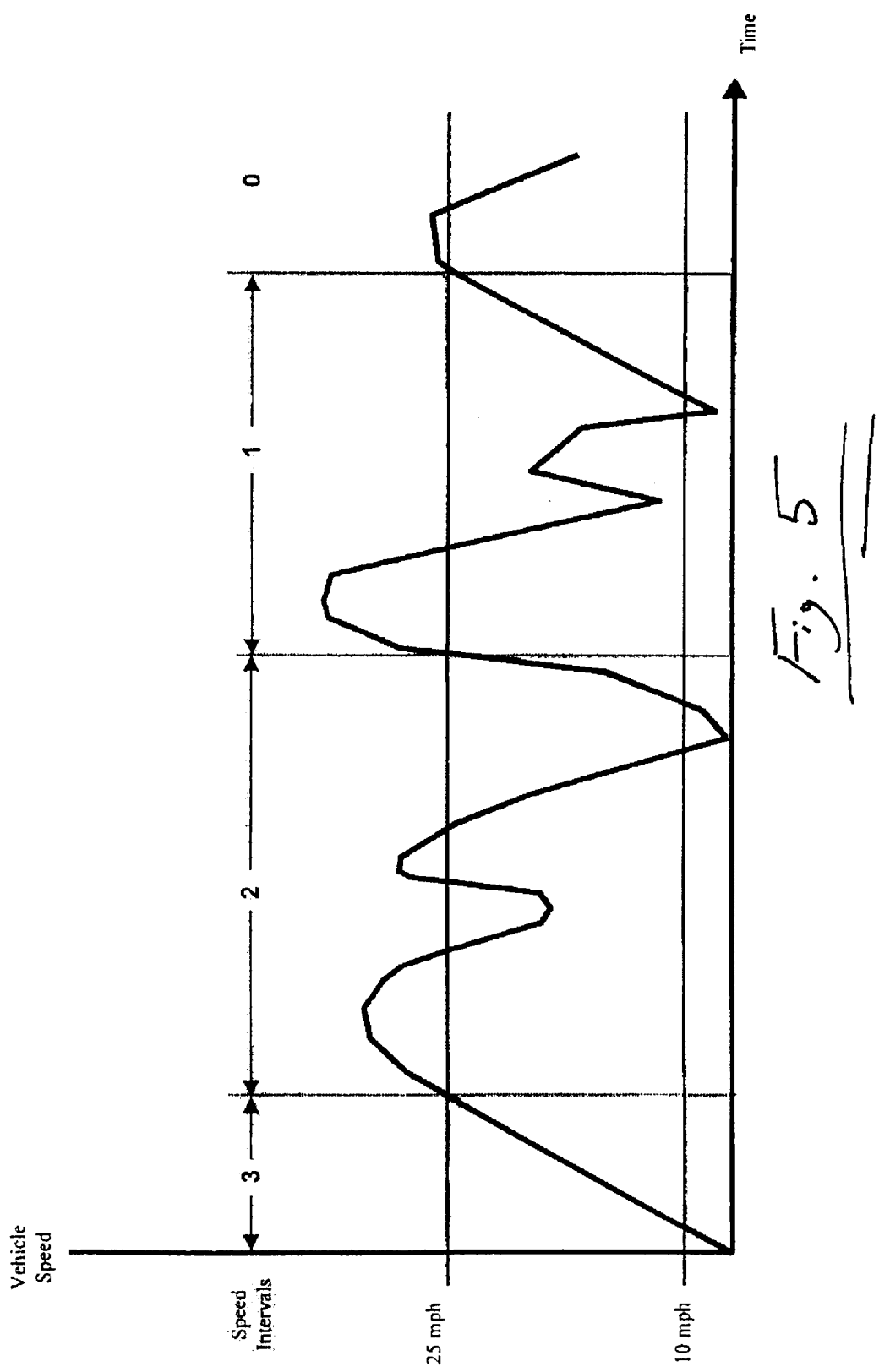
FIG. 5 is an example of counting speed cycles in a Diagnostic Evaluation Routine for a system and method for digital steering sensor fault detection made in accordance with the present invention.

FIG. 5 is an example of counting speed cycles in a Diagnostic Evaluation Routine for a system and method for digital steering sensor fault detection made in accordance with the present invention. In the example, the upper threshold speed is set at 25 mph and the lower threshold speed is set at 10 mph. Starting at the right of the graph at speed interval 0, the vehicle speed climbs above the upper threshold speed, and then drops below the upper threshold speed to initiate the first speed interval. The first speed interval continues until the vehicle speed climbs above the upper threshold speed, then drops below the upper threshold speed to initiate the second speed interval. The cycle repeats until the set speed cycle limit is reached, at which time the Fault Evaluation Routine is initiated. The Diagnostic Evaluation Routine discussed above, which counts speed cycles when the vehicle speed is less than the lower threshold speed after being greater than the upper threshold speed, provides one example of determining speed cycles by monitoring vehicle speed. In another embodiment, the speed cycle counter can be advanced when the vehicle speed is greater than the upper threshold speed after being less than the lower threshold speed.

Figure 6:
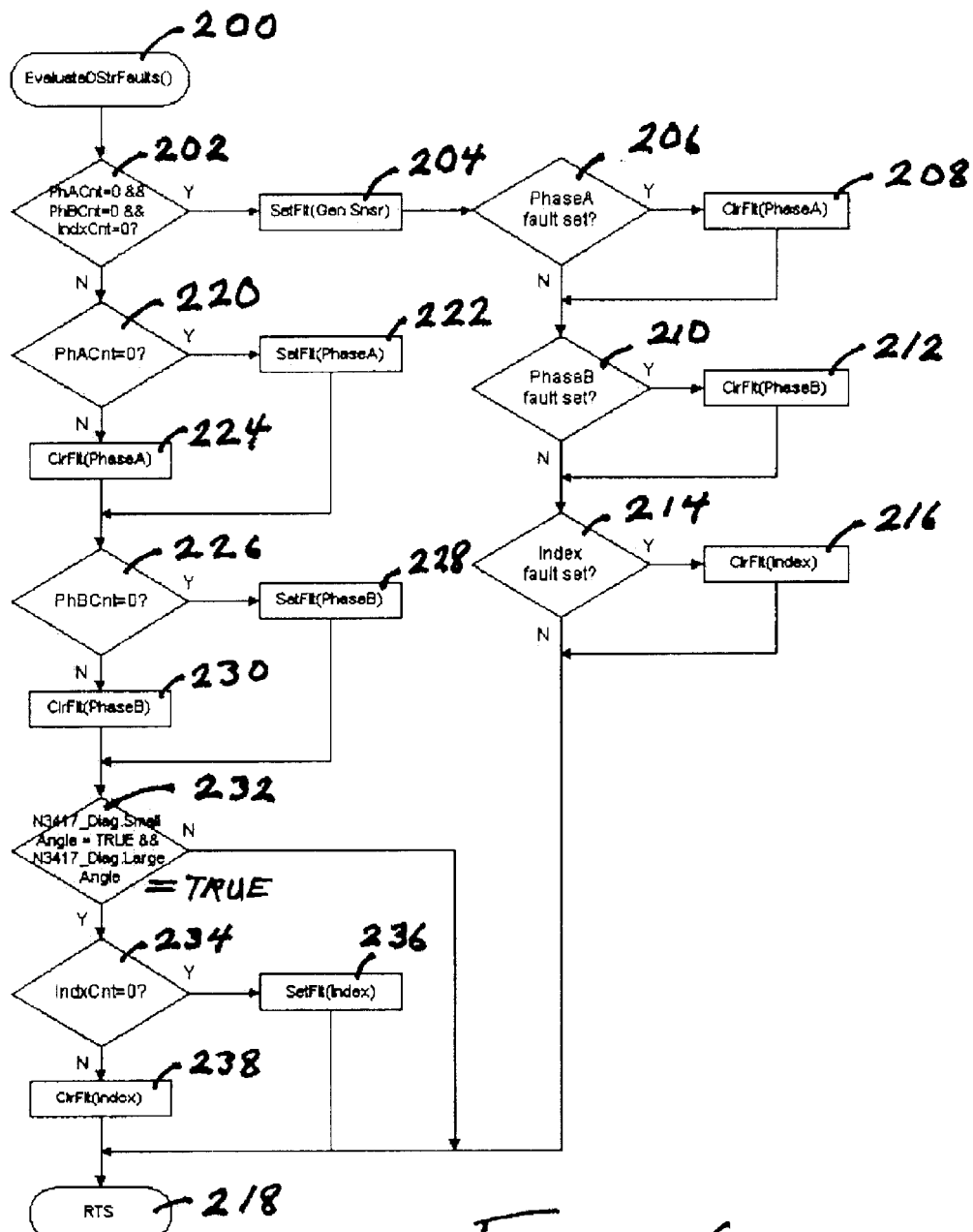
FIG. 6 is a flow chart of a Fault Evaluation Routine for a system and method for digital steering sensor fault detection made in accordance with the present invention.

FIG. 6 is a flow chart of a Fault Evaluation Routine for a system and method for digital steering sensor fault detection made in accordance with the present invention. The Fault Evaluation Routine is executed when the Diagnostic Evaluation routine has detected the required number of speed cycles. Within this routine, the appropriate faults are determined by analyzing the signal count information from the Sensor Activity Detection Routine. If no activity is detected on a particular input, this routine will store the associated fault code in memory as fault bit information. The associated fault code can then be logged and the appropriate action taken for the degraded condition. After completing the fault analysis, the routine re-initializes the Sensor Activity Detection Routine and the Diagnostic Evaluation Routine to begin another measurement cycle.

The Fault Evaluation Routine is activated at 200 when requested by the Diagnostic Evaluation Routine. At 202, the general sensor fault is checked by seeing if Phase A Count (PhACnt), Phase B Count (PhBCnt), and Index Count (IndxCnt) are all zero. If all are zero, indicating a sensor fault, the general sensor fault bit is set at 204 (SetFlt(Gen Snsr)) and any individual fault bits are checked (206; 210; 214) to see if the individual fault bit is set, and cleared if set (208; 212; 216). The Fault Evaluation Routine then ends at 218.

If there is no general sensor fault at 202, the routine checks for Phase A, Phase B, and Index faults in turn. If the Phase A Count is zero at 220, the Phase A fault bit is set at 222 (SetFlt(PhaseA)) and the routine proceeds to check Phase B Count at 226. If the Phase A Count is not zero at 220, the Phase A fault bit is cleared at 224 (ClrFlt(PhaseA)) and the routine proceeds to check Phase B Count at 226.

If the Phase B Count is zero at 226, the Phase B fault bit is set at 228 (SetFlt(PhaseB)) and the routine proceeds to check Index Count. If the Phase B Count is not zero at 226, the Phase B fault bit is cleared at 230 (ClrFlt(PhaseB)) and the routine proceeds to check Index Count.

In one embodiment, the Fault Evaluation Routine can include an optional routine using turning activity information to assure that the Index Count is handled correctly. Typically, the Digital—Index signal only changes state at set steering wheel rotations, e.g., +10 and −10 degrees. Because the steering wheel may not turn often if the vehicle is on a straight road and the threshold speeds are set relatively close together, it can be desirable to use a secondary information source to verify turning activity before evaluating the Index Count. In one embodiment, the turning activity information can be analog steering wheel position information. The routine checks at 232 to see if a small steering angle (N3417_Diag.SmallAngle) and large steering angle (N3417_Diag.LargeAngle) conditions are present, indicating turning activity is being sensed. If not present, the Fault Evaluation Routine ends at 218. If present, the Index Count is checked at 234. The steering wheel position information is discussed further for FIG. 7. In other embodiments, other turning activity information can be used, such as a second independent digital steering input from a digital steering wheel position sensor or lateral vehicle acceleration from a lateral vehicle accelerometer.

Referring to FIG. 6, if the Index Count is zero at 234, the Index fault bit is set at 236 (SetFlt(Index)) and the routine ends at 218. If the Index Count is not zero at 234, the Index fault bit is cleared at 238 (ClrFlt(Index)) and the routine ends at 218.

Figure 7:
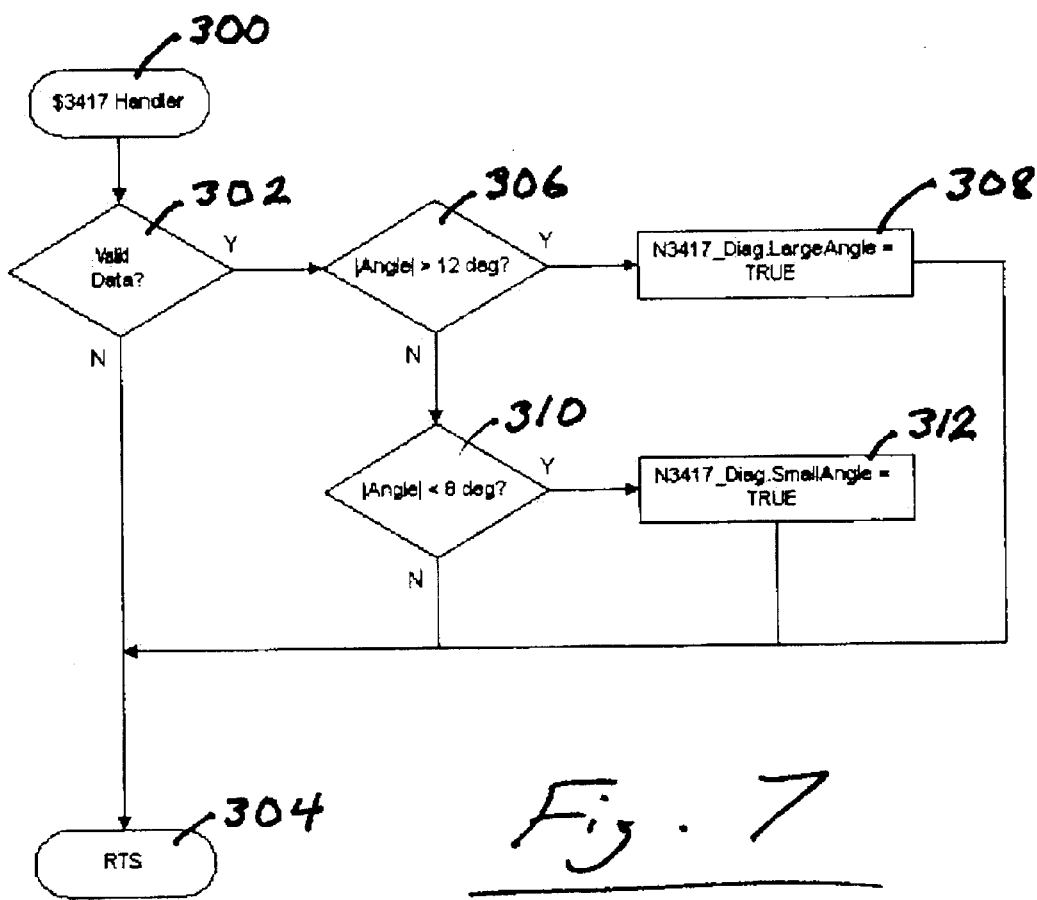
FIG. 7 is a flow chart of a Serial Communication Handling Routine for a system and method for digital steering sensor fault detection made in accordance with the present invention.

FIG. 7 is a flow chart of a Serial Communication Handling Routine for a system and method for digital steering sensor fault detection made in accordance with the present invention. The Serial Communication Handling Routine can be used in one embodiment to provide extra assurance that the Index Count is handled correctly or in another embodiment using analog steering wheel position information instead of the digital Index Count. The Serial Communication Handling Routine is initiated at 300 on receipt of a serial communication message containing steering angle information derived from analog steering wheel position information. The data validity is checked at 302 and the routine ends at 304 if the data is invalid. If the data is valid, the absolute value of the steering angle is checked at 306 to see if it is greater than a set large angle value. The large angle value is typically about 12 degrees, but can range from 11 degrees to 349 degrees. If the absolute value of the steering angle is greater than the large angle value, the large steering angle condition (N3417_Diag.LargeAngle) is set to true at 308 and the routine ends at 304. If the absolute value of the steering angle is not greater than the large angle value, the routine checks if the absolute value of the steering angle is less than a set small angle value at 310. The small angle value is typically about 8 degrees, but can range from 1 degree to 9 degrees. If the absolute value of the steering angle is less than the small angle value, the small steering angle condition (N3417_Diag.SmallAngle) is set to true at 312 and the routine ends at 304.

FIG. 8 is a Fault Table for a system and method for digital steering sensor fault detection made in accordance with the present invention. Different faults, such as 1) digital output signal open circuited, shorted-to-battery or shorted-to-ground; 2) digital steering sensor ground (return) circuit open; and 3) digital steering sensor supply circuit open, can be diagnosed. The values for the general sensor fault bit, Phase A fault bit, Phase B fault bit, and Index fault bit obtained by the Fault Evaluation Routine can be compared to the fault table and the particular fault determined. In the present embodiment, a short-to-battery fault on any output will result in a General Sensor fault. Otherwise, fault detection logic on sensor outputs is independent. Output short-to-ground or open-circuit faults only affect the faulted signal output.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of fault detection for a digital steering wheel position sensor, comprising the steps of:
   initializing a value change counter;
   initializing a speed cycle counter;
   monitoring steering wheel position information from the digital steering wheel position sensor at set time intervals;
   determining the steering wheel position information for the current time interval and the steering wheel position information for the previous time interval;
   advancing the value change counter if the steering wheel position information for the current time interval is different from the steering wheel position information for the previous time interval;
   monitoring vehicle speed;
   advancing the speed cycle counter when the vehicle speed crosses a first threshold speed after crossing a second threshold speed; and
   setting fault bit information if the value change counter is zero after the speed cycle counter reaches a speed cycle limit.

2. The method of claim 1 wherein the first threshold speed is a lower threshold speed and the second threshold speed is an upper threshold speed.

3. The method of claim 2 wherein the lower threshold speed is about 15 kph and the upper threshold speed is about 50 kph.

4. The method of claim 1 wherein the first threshold speed is an upper threshold speed and the second threshold speed is a lower threshold speed.

5. The method of claim 4 wherein the lower threshold speed is about 15 kph and the upper threshold speed is about 50 kph.

6. The method of claim 1 wherein:
   the steering wheel position information comprises a Phase A signal, a Phase B signal, and an Index signal;
   the value change counter comprises a Phase A count, a Phase B count, and an Index count;
   the fault bit information comprises a Phase A fault bit, a Phase B fault bit, and an Index fault bit;
   the step of advancing the value change counter if the steering wheel position information for the current time interval is different from the steering wheel position information for the previous time interval further comprises the steps of advancing the Phase A count if the Phase A signal for the current time interval is different from the Phase A signal for the previous time interval, advancing the Phase B count if the Phase B signal for the current time interval is different from the Phase B signal for the previous time interval, advancing the Index count if the Index signal for the current time interval is different from the Index signal for the previous time interval; and
   the step of setting fault bit information if the value change counter is zero after the speed cycle counter reaches a speed cycle limit further comprises the steps of setting the Phase A fault bit if the Phase A count is zero after the speed cycle counter reaches a speed cycle limit, setting the Phase B fault bit if the Phase B count is zero after the speed cycle counter reaches a speed cycle limit, setting the Index fault bit if the Index count is zero after the speed cycle counter reaches a speed cycle limit.

7. The method of claim 6 further comprising the step of determining a particular fault by looking up the particular fault associated with the values of the Phase A fault bit, the Phase B fault bit, and the Index fault bit on a fault table.

8. The method of claim 6 further comprising the step of setting a general sensor fault if the Phase A fault bit, the Phase B fault bit, and the Index fault bit are all zero after the speed cycle counter reaches a speed cycle limit.

9. The method of claim 6 wherein the step of setting the Index fault bit if the Index count is zero after the speed cycle counter reaches a speed cycle limit further comprises the steps of:
   providing analog steering wheel position information from an analog steering wheel position sensor;
   determining from the analog steering wheel position information whether turning activity is present;
   setting the Index fault bit if the Index count is zero after the speed cycle counter reaches a speed cycle limit and if the turning activity is present.

10. The method of claim 9 wherein the step of determining from the analog steering wheel position information whether turning activity is present further comprises the steps of:
   determining if the absolute value of the analog steering wheel position information is greater than a large angle setpoint;

determining if the absolute value of the analog steering wheel position information is less than a small angle setpoint; and concluding that the turning activity is present if the absolute value of the analog steering wheel position information is greater than a large angle setpoint and if the absolute value of the analog steering wheel position information is less than a small angle setpoint.

11. The method of claim 10 wherein the large angle setpoint is about 12 degrees and the small angle setpoint is about 8 degrees.

12. The method of claim 6 wherein the step of setting the Index fault bit if the Index count is zero after the speed cycle counter reaches a speed cycle limit further comprises the steps of:

providing turning information from a turning information sensor;

determining from the turning information whether turning activity is present;

setting the Index fault bit if the Index count is zero after the speed cycle counter reaches a speed cycle limit and if the turning activity is present.

13. The method of claim 12 wherein the turning information sensor is selected from the group consisting of an analog steering wheel position sensor, a digital steering wheel position sensor, and a lateral vehicle accelerometer.

14. A computer readable medium storing a computer program for fault detection for a digital steering wheel position sensor, comprising:

computer readable code for initializing a value change counter;

computer readable code for initializing a speed cycle counter;

computer readable code for monitoring steering wheel position information from the digital steering wheel position sensor at set time intervals;

computer readable code for determining the steering wheel position information for the current time interval and the steering wheel position information for the previous time interval;

computer readable code for advancing the value change counter if the steering wheel position information for the current time interval is the same as the steering wheel position information for the previous time interval;

computer readable code for monitoring vehicle speed;

computer readable code for advancing the speed cycle counter when the vehicle speed crosses a first threshold speed after crossing a second threshold speed; and computer readable code for setting fault bit information if the value change counter is zero after the speed cycle counter reaches a speed cycle limit.

15. The computer readable medium of claim 14 wherein the first threshold speed is a lower threshold speed and the second threshold speed is an upper threshold speed.

16. The computer readable medium of claim 15 wherein the lower threshold speed is about 15 kph and the upper threshold speed is about 50 kph.

17. The computer readable medium of claim 14 wherein the first threshold speed is an upper threshold speed and the second threshold speed is a lower threshold speed.

18. The computer readable medium of claim 17 wherein the lower threshold speed is about 15 kph and the upper threshold speed is about 50 kph.

19. The computer readable medium of claim 14 wherein:

the steering wheel position information comprises a Phase A signal, a Phase B signal, and an Index signal;

the value change counter comprises a Phase A count, a Phase B count, and an Index count;

the fault bit information comprises a Phase A fault bit, a Phase B fault bit, and an Index fault bit;

the computer readable code for advancing the value change counter if the steering wheel position information for the current time interval different from the steering wheel position information for the previous time interval further comprises computer readable code for advancing the Phase A count if the Phase A signal for the current time interval is different from the Phase A signal for the previous time interval, computer readable code for advancing the Phase B count if the Phase B signal for the current time interval is different from the Phase B signal for the previous time interval, computer readable code for advancing the Index count if the Index signal for the current time interval is different from the Index signal for the previous time interval; and the computer readable code for setting fault bit information if the value change counter is zero after the speed cycle counter reaches a speed cycle limit further comprises computer readable code for setting the Phase A fault bit if the Phase A count is zero after the speed cycle counter reaches a speed cycle limit, computer readable code for setting the Phase B fault bit if the Phase B count is zero after the speed cycle counter reaches a speed cycle limit, computer readable code for setting the Index fault bit if the Index count is zero after the speed cycle counter reaches a speed cycle limit.

20. The computer readable medium of claim 19 further comprising computer readable code for determining a particular fault by looking up the particular fault associated with the values of the Phase A fault bit, the Phase B fault bit, and the Index fault bit on a fault table.

21. The computer readable medium of claim 19 further comprising computer readable code for setting a general sensor fault if the Phase A fault bit, the Phase B fault bit, and the Index fault bit are all zero after the speed cycle counter reaches a speed cycle limit.

22. The computer readable medium of claim 19 wherein the computer readable code for setting the Index fault bit if the Index count is zero after the speed cycle counter reaches a speed cycle limit further comprises:

computer readable code for providing analog steering wheel position information from an analog steering wheel position sensor;

computer readable code for determining from the analog steering wheel position information whether turning activity is present;

computer readable code for setting the Index fault bit if the Index count is zero after the speed cycle counter reaches a speed cycle limit and if the turning activity is present.

23. The computer readable medium of claim 22 wherein the computer readable code for determining from the analog steering wheel position information whether turning activity is present further comprises:

computer readable code for determining if the absolute value of the analog steering wheel position information is greater than a large angle setpoint;

computer readable code for determining if the absolute value of the analog steering wheel position information is less than a small angle setpoint; and computer readable code for concluding that the turning activity is present if the absolute value of the analog steering wheel position information is greater than a large angle setpoint and if the absolute value of the analog steering wheel position information is less than a small angle setpoint.

24. The computer readable medium of claim 23 wherein the large angle setpoint is about 12 degrees and the small angle setpoint is about 8 degrees.

25. The computer readable medium of claim 19 wherein the computer readable code for setting the Index fault bit if the Index count is zero after the speed cycle counter reaches a speed cycle limit further comprises:

computer readable code for providing turning information from turning information sensor;

computer readable code for determining from the turning information whether turning activity is present;

computer readable code for setting the Index fault bit if the Index count is zero after the speed cycle counter reaches a speed cycle limit and if the turning activity is present.

26. The computer readable medium of claim 25 wherein the turning information sensor is selected from the group consisting of an analog steering wheel position sensor, a digital steering wheel position sensor, and a lateral vehicle accelerometer.

27. A system for fault detection for a digital steering wheel position sensor, comprising:

means for initializing a value change counter;

means for initializing a speed cycle counter;

means for monitoring steering wheel position information from the digital steering wheel position sensor at set time intervals;

means for determining the steering wheel position information for the current time interval and the steering wheel position information for the previous time interval;

means for advancing the value change counter if the steering wheel position information for the current time interval is different from the steering wheel position information for the previous time interval;

means for monitoring vehicle speed;

means for advancing the speed cycle counter when the vehicle speed crosses a first threshold speed after crossing a second threshold speed; and means for setting fault bit information if the value change counter is zero after the speed cycle counter reaches a speed cycle limit.

28. The system of claim 27 wherein:

the steering wheel position information comprises a Phase A signal, a Phase B signal, and an Index signal;

the value change counter comprises a Phase A count, a Phase B count, and an Index count;

the fault bit information comprises a Phase A fault bit, a Phase B fault bit, and an Index fault bit;

the means for advancing the value change counter if the steering wheel position information for the current time interval is different from the steering wheel position information for the previous time interval further comprises means for advancing the Phase A count if the Phase A signal for the current time interval is different from as the Phase A signal for the previous time interval, means for advancing the Phase B count if the Phase B signal for the current time interval is different from as the Phase B signal for the previous time interval, means for advancing the Index count if the Index signal for the current time interval is different from the Index signal for the previous time interval; and the means for setting fault bit information if the value change counter is zero after the speed cycle counter reaches a speed cycle limit further comprises means for setting the Phase A fault bit if the Phase A count is zero after the speed cycle counter reaches a speed cycle limit, means for setting the Phase B fault bit if the Phase B count is zero after the speed cycle counter reaches a speed cycle limit, means for setting the Index fault bit if the Index count is zero after the speed cycle counter reaches a speed cycle limit.

29. The system of claim 28 further comprising means for determining a particular fault by looking up the particular fault associated with the values of the Phase A fault bit, the Phase B fault bit, and the Index fault bit on a fault table.

30. The system of claim 28 further comprising means for setting a general sensor fault if the Phase A fault bit, the Phase B fault bit, and the Index fault bit are all zero after the speed cycle counter reaches a speed cycle limit.

31. The system of claim 28 wherein the means for setting the Index fault bit if the Index count is zero after the speed cycle counter reaches a speed cycle limit further comprises:

means for providing analog steering wheel position information from an analog steering wheel position sensor;

means for determining from the analog steering wheel position information whether turning activity is present;

means for setting the Index fault bit if the Index count is zero after the speed cycle counter reaches a speed cycle limit and if the turning activity is present.

32. The system of claim 31 wherein the means for determining from the analog steering wheel position information whether turning activity is present further comprises:

means for determining if the absolute value of the analog steering wheel position information is greater than a large angle setpoint;

means for determining if the absolute value of the analog steering wheel position information is less than a small angle setpoint; and means for concluding that the turning activity is present if the absolute value of the analog steering wheel position information is greater than a large angle setpoint and if the absolute value of the analog steering wheel position information is less than a small angle setpoint.

33. The system of claim 28 wherein the means for setting the Index fault bit if the Index count is zero after the speed cycle counter reaches a speed cycle limit further comprises:

means for providing turning information from turning information sensor;

means for determining from the turning information whether turning activity is present;

means for setting the Index fault bit if the Index count is zero after the speed cycle counter reaches a speed cycle limit and if the turning activity is present.

* * * * *